United States Patent [19]

Ortner et al.

[11] 4,231,526
[45] Nov. 4, 1980

[54] PROCESS AND APPARATUS FOR TREATING WASTE PAPER

[75] Inventors: Herbert Ortner; Theodor Bahr; Walter Musselmann, all of Heidenheim, Fed. Rep. of Germany

[73] Assignee: J. M. Voith GmbH, Heidenheim, Fed. Rep. of Germany

[21] Appl. No.: 974,333

[22] Filed: Dec. 29, 1978

[30] Foreign Application Priority Data

Dec. 30, 1977 [DE] Fed. Rep. of Germany ....... 2759113

[51] Int. Cl.$^3$ ..................... B02C 23/38; B02C 23/10; B02C 23/14
[52] U.S. Cl. .......................... 241/28; 162/4; 162/55; 209/3; 241/29; 241/46.17; 241/78
[58] Field of Search .................. 241/28, 21, 24, 29, 241/46.02, 46.11, 46.17, 77, 78, 79.1, 152 R; 209/3, 12, 17; 162/4, 55

[56] References Cited
U.S. PATENT DOCUMENTS

| | | | |
|---|---|---|---|
| 2,947,655 | 8/1960 | Eberhardt | 241/28 |
| 3,405,803 | 10/1968 | Bahr et al. | 209/211 |
| 3,844,488 | 10/1974 | Neitzel | 241/46.02 |
| 3,925,150 | 12/1975 | Marsl | 241/28 |
| 4,017,033 | 4/1977 | Tra | 241/28 |

Primary Examiner—Peter F. Kratz
Attorney, Agent, or Firm—Albert L. Jeffers; John F. Hoffman

[57] ABSTRACT

A process and plant for treating waste paper in which a beater is employed for rough-pulping the waste paper followed by a first sorting stage from which the separated-out foreign matter is processed further in a subsidiary circuit which includes a vibratory sorter for lightweight foreign matter and a hydrocyclone for heavy foreign matter, the fibers separated out during this further processing being returned again to the treatment process. In the first sorting stage, a sufficiently rigorous separation process is carried out to remove the greater part of the foreign matter, together with unpulped lumps of fibers, which is then passed to the subsidiary circuit in which it and half-stuffs still containing foreign matter, which have been sorted in the hydro-cyclone and in the vibratory sorter, are subjected together to a multi-stage further sorting and speck-removing process. The plant is characterized in that the strainer has such small holes that, in general, only pulped fibers can pass through it, and in that in the subsidiary circuit behind the vibratory sorter and the hydro-cyclone a second sorter is arranged, the half-stuff outlet duct from which opens out again in the treatment process.

10 Claims, 1 Drawing Figure

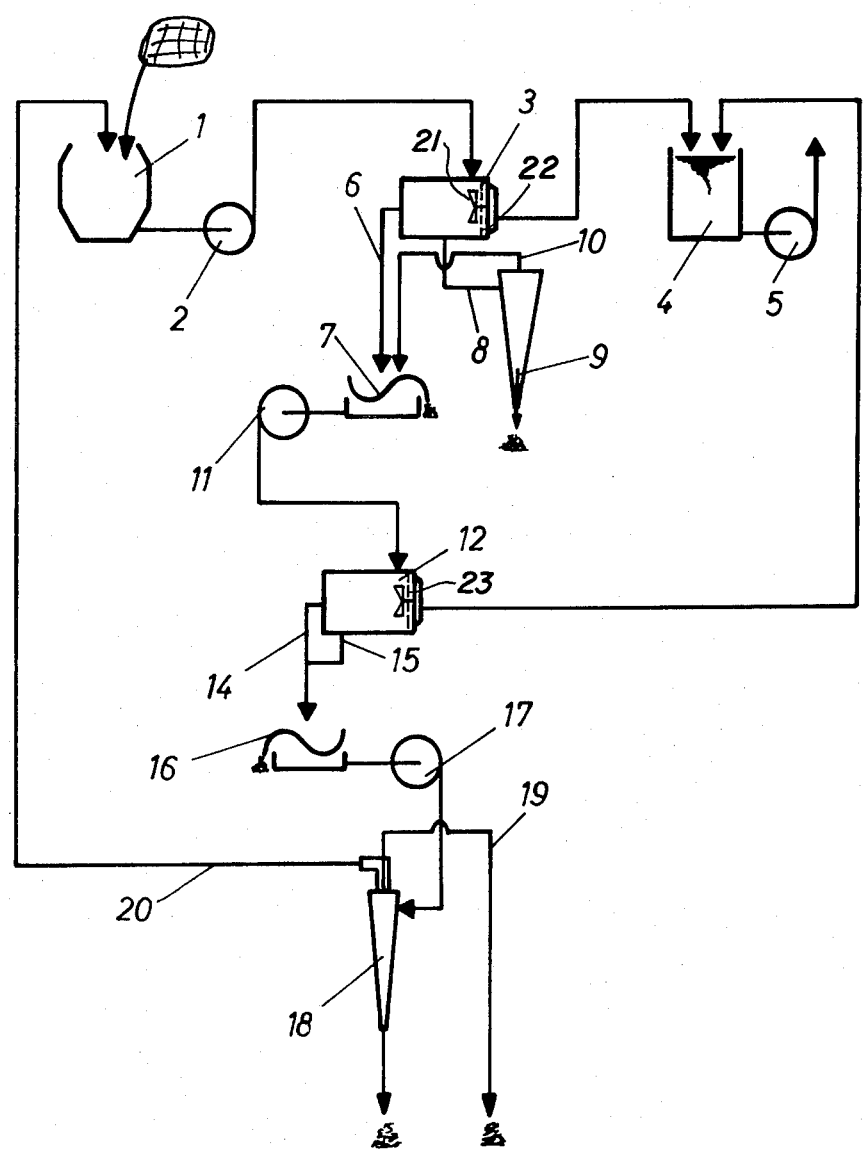

PROCESS AND APPARATUS FOR TREATING WASTE PAPER

BACKGROUND OF THE INVENTION

The invention relates to a process for treating waste paper of the type employing a beater for rough-pulping the waste paper, followed by a first sorting stage from which foreign matter separated out is processed further in a subsidiary circuit which incorporates a vibratory sorter for lightweight foreign matter and a hydro-cyclone for heavy foreign matter, the fibers separated out during this further processing being returned again to the treatment process.

Until now, the impurities present in waste paper have been separated out in most cases in the main stream, during the treatment process, in sequence in speck-removing devices and sorting devices. However, this results in heavy contamination of the purifying equipment. Moreover, there is the problem that the foreign matter left in suspension for increasingly long periods is gradually reduced to such a small size that its removal becomes increasingly difficult and under certain circumstances, no longer possible at all. Consequently, this has had a detrimental effect on the quality of the treated raw material.

It is therefore already known from German Pat. No. 2,514,162 to provide as the first sorting stage, a so-called lightweight material pulper, in which a large part of the foreign matter to be separated out is removed. However, so that the fiber losses remain within bounds, the mesh of the strainer in the vibratory sorter located in the subsidiary circuit has to be relatively coarse. This means that relatively large pieces of foreign matter also pass through the strainer mesh and so re-enter the treatment process, which leads to an undesirable concentration of the suspension with foreign matter and, with repeated circulation, these pieces of foreign matter can be broken down undesirably small so that finally they pass through small holes of a half-stuff strainer in the lightweight material pulper and remain in the fibrous suspension.

SUMMARY OF THE INVENTION

An object of the present invention is therefore to provide a treatment process for waste paper, by means of which a better quality pulp can be produced with an acceptable level of capital outlay on equipment.

According to one aspect of the invention a process for treating waste paper of the type described above is characterized in that, in the first sorting stage, a sufficiently rigorous separating process is carried out to remove the greater part of the foreign matter, together with un-pulped lumps of fibers, which is then passed to the subsidiary circuit in which it and half-stuffs, which have been sorted in the hydro-cyclone and in the vibratory sorter and still contain some foreign matter, are subjected together to a multi-stage further sorting and speck-removing process.

With the process according to the invention the foreign matter present in the waste paper is separated from the main stream with the pulped fibers right at the beginning of the treatment process in the thick stock range in the first sorting stage, and is separated from the fibers which still adhere to it in a separate subsidiary circuit. The speck-removing and cleaning equipment usually arranged in the main stream for treating the fibers therefore becomes superfluous. In addition, the foreign matter is prevented from being entrained any longer than is absolutely necessary. Due to the almost complete removal of the foreign matter in the subsidiary circuit, a concentration or a circulation of foreign matter in the treatment process is substantially prevented.

Provision is made in a further development of the invention for the half-stuff from the hydro-cyclone to be delivered to the vibratory sorter. In this way, joint further processing of the foreign matter which is to be removed can be carried out.

According to another aspect of this invention a plant for carrying out a process of the type referred to above, includes a first sorting stage which consists of a rotationally symmetrical light material pulper arranged with a rotor therein at one end and to provide an overpressure, and having in its peripheral wall an outlet hole for heavy foreign matter and in a central region of its end wall opposite to the rotor another outlet hole for lightweight foreign matter, and also having a strainer arranged in front of the half-stuff outlet, and is characterized in that the strainer has such small holes that, in general, only pulped fibers can pass through it, and in that in the subsidiary circuit behind the vibratory sorter and the hydro-cyclone there is a second sorter, the half-stuff outlet duct from which emerges again in the treatment process.

In the second sorter, which can be constructed so that speck removal may be carried out and which is connected to the half-stuff outlet duct from the hydro-cyclone and in the vibratory sorter, further pulping of the lumps of fibrous material and removal of the foreign matter can be carried out.

Provision is made, in a further development of the invention, for the outlet ducts for the separated-out foreign matter from the second sorter to lead to a further sorter with smaller holes than the first vibratory sorter. In this instance, according to the invention, provision is made for the additional sorter to be a vibratory sorter. Naturally, within the scope of the invention, a sorter operated by pressure may also be used.

It is advantageous if the half-stuff from the additional sorter is delivered to a hydro-cyclone which has an outlet hole for heavy sludge, an outlet for lightweight sludge arranged in a central zone of the hydro-cyclone and a drainage duct for half-stuff arranged coaxially around the outlet for lightweight sludge, the drainage duct for half-stuff emerging again in the treatment process. A hydro-cyclone by means of which very lightweight foreign matter can be separated out as well as heavy sludge is described, for example, in German Pat. No. 1,442,503.

By employing these measures, almost complete removal of the troublesome foreign matter is achieved in the subsidiary circuit. Certain lightweight foreign matter, particularly bits of latex, adhesive particles and the like, may still be present in the half-stuff which comes from the last sorter in the sequence. This foreign matter is now removed in the said hydro-cyclone.

BRIEF DESCRIPTION OF THE DRAWING

One process according to the invention will now be described with reference to the accompanying drawing, which is a schematic showing of the basic process and plant, and further characteristics of the invention will be found in this description.

DETAILED DESCRIPTION

Waste paper to be treated arrives in the form of bales which are fed to a beater 1 for rough pulping, and is conducted from there at a stock density of 4 to 5% via a pump 2 into a rotationally symmetrical lightweight material pulper 3. This lightweight material pulper is of known design with a rotor 21 arranged therein at one end and in which an over-pressure prevails (see, for example, German Pat. No. 2,514,162). The half-stuff, i.e., the pulped fibers, is drawn off through a strainer 22 at a stock density of 4 to 4.5%, and is conducted to an intermediate vat 4, from which it is pumped via a pump 5 for further processing.

From the lightweight material pulper 3, lightweight foreign matter is delivered to a vibratory sorter 7 via a duct 6. Heavy foreign matter, which accumulates around the periphery of the lightweight material pulper 3, is delivered to a hydro-cyclone 9 via a duct 8, at a stock density of 1 to 1.5%. The amount of separated-out foreign matter, together with water and fibers (fibrous lumps) is about 20% of the amount supplied to the lightweight material pulper 3. The foreign matter separated out in the hydro-cyclone is removed, whilst the suspension which arrives in a half-stuff duct 10 is also delivered to the vibratory sorter 7. The vibratory sorter 7 has a strainer with a relatively large hole width, so that not too much lumpy fibrous material is lost. The half-stuff from the vibratory sorter 7 is delivered via a pump 11 at a stock density of 1.5 to 2% to a second sorter, such as a lightweight material pulper 12, for example. The half-stuffs which end up behind the strainer 23 of this sorter 12, i.e., recovered fibers, are conducted away in quantities of around 70% of the amount supplied to the sorter 12, via a duct, and deposited in the intermediate vat 4. The lightweight and heavy foreign matter separated out in the second sorter 12 is delivered via ducts 14 and 15 to a second vibratory sorter 16 having a strainer with correspondingly smaller hole width. From the half-stuff duct of the vibratory sorter 16 the suspension is delivered via a pump 17 to a hydro-cyclone, at a stock density of 0.5 to 2%. Heavy foreign matter separated out in the hydro-cyclone 18 in the form of sludge is removed as waste at its lower end, as is certain very lightweight foreign matter (or sludge) which accumulates in a central duct 19 of the hydro-cyclone. The recovered fibers are returned to the beater 1 via the half-stuff outlet duct 20 of the hydro-cyclone 18.

The hole-width in the lightweight material pulper 3 is chosen so that about 10–30% of the suspension arriving in the lightweight pulper is drawn off into the subsidiary circuit for removal of the foreign matter. By an appropriate choice of the design and arrangement of the sorting and de-specking appliances in this subsidiary circuit, it is ensured that any fibrous material which is present in largely recovered, whilst any foreign matter is removed.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A process for treating waste paper comprising:
   rough pulping the waste paper in a beater,
   treating the rough pulped waste paper from the beater in a lightweight material pulper wherein unpulped lumps of fibers and half-stuff containing foreign matter are separated from half-stuff substantially free of foreign matter,
   conveying away the half-stuff nearly free of foreign matter,
   treating one portion of the unpulped lumps of fibers and half-stuff containing foreign matter in a hydro-cyclone wherein foreign matter is separated from half-stuff containing some foreign matter,
   treating the remaining portion of the unpulped lumps of fibers and half-stuff containing foreign matter from the lightweight material pulper together with the half-stuff containing some foreign matter from the hydro-cyclone in a vibratory sorter to separate the still further foreign matter from half-stuff containing some foreign matter,
   treating the half-stuff containing some foreign matter from the vibratory sorter in a further multi-stage sorting and speck removing apparatus wherein additional foreign matter is separated from half-stuff, and
   the last-mentioned half-stuff is returned to be again treated in the lightweight material pulper,
   wherein the lightweight material pulper separates half-stuff containing heavy foreign matter from half-stuff containing lightweight foreign matter, the half-stuff containing heavy foreign matter being conveyed directly to the hydro-cyclone, and the half-stuff containing lightweight foreign matter being conveyed directly to the vibratory sorter.

2. The process of claim 1 wherein the further multi-stage sorting and speck removing apparatus includes a second lightweight material pulper which treats the half-stuff from the vibratory sorter to separate half-stuff substantially free of foreign matter from half-stuff containing foreign matter, and the half-stuff substantially free of foreign matter is conveyed away and mixed with the half-stuff substantially free of foreign matter from the first mentioned lightweight material pulper.

3. The process of claim 2 wherein the further multi-stage sorting and speck removing apparatus includes a second vibratory sorter which treats the half-stuff containing foreign matter from the second material pulper to separate foreign matter from half-stuff still containing some foreign matter, and wherein the second vibratory sorter has a smaller strainer hole width than the first mentioned vibratory sorter.

4. The process of claim 3 wherein the further multi-stage sorting and speck removing apparatus includes a second hydro-cyclone which treats the half-stuff containing some foreign matter from the second vibratory sorter to separate foreign matter from half-stuff and returns the separated half-stuff to the beater.

5. The process of claim 1 wherein the last mentioned half-stuff is conveyed from the multi-stage sorting and speck removing apparatus to the pulper via the beater.

6. A waste paper treatment plant comprising:
   beater means for rough pulping waste paper,
   first pulping and sorter means connected to the beater means for treating rough pulped waste paper to separate unpulped lumps of fibers and half-stuff containing foreign matter from half-stuff nearly free of foreign matter,
   hydro-cyclone means connected to said first pulping and sorter means for receiving one portion of the separated out fibers and half-stuff containing heavy foreign matter, said hydro-cyclone means separating foreign matter from half-stuff containing some foreign matter, vibratory sorter means separately connected to said first pulping and sorter means for receiving the other portion of the separated out fibers and half-stuff containing lightweight foreign matter therefrom, said vibratory sorter means being connected to said hydro-cyclone means to receive the half-stuff containing some foreign matter therefrom, said vibratory sorter means treating material received thereby to separate the foreign matter from half-stuff still containing some foreign matter, and multi-stage sorting and speck removing means connected to said vibratory sorter means to receive therefrom the half-stuff containing some foreign matter for separating out half-stuff nearly free of foreign matter and returning at least some of said last mentioned half-stuff to a point in the plant upstream of said first pulping and sorter means.

7. The waste paper treatment plant of claim 6 wherein said first pulping and sorter means comprises a rotationally symmetrical lightweight material pulper adapted to operate under pressure and having a rotor at one end, an outlet opening in its peripheral wall for heavy foreign matter, an outlet hole for lightweight foreign matter in a central region of an end wall opposite said rotor, a half-stuff outlet, a strainer in front of said half-stuff outlet having holes sufficiently small to permit only pulp fibers to pass therethrough, and wherein said sorting and speck removing means is downstream of said vibratory sorter means and said hydro-cyclone means and comprises second pulping and sorter means having a half-stuff outlet duct.

8. The plant of claim 7 including third sorter means connected to said second pulping and sorter means to receive material from said second pulping and sorter means and adapted to separate out finer material than said vibratory sorter.

9. The plant of claim 8 wherein said third sorter means is a vibratory sorter.

10. The plant of claim 8 wherein said third sorter means is connected to and delivers half-stuff to a second hydro-cyclone separator which has an outlet hole for heavy sludge, an outlet for lightweight sludge located in a central region of said second hydro-cyclone separator, and a half-stuff drainage duct located coaxially around the second hydro-cyclone inlet, said drainage duct being connected to a point in the plant upstream of said first pulping and sorter means.

* * * * *